United States Patent

[11] 3,601,037

| [72] | Inventor | Basil H. Giaretta<br>Decatur, Ga. |
|---|---|---|
| [21] | Appl. No. | 808,834 |
| [22] | Filed | Mar. 20, 1969 |
| [45] | Patented | Aug. 24, 1971 |
| [73] | Assignee | Broil-O-Matic Corporation<br>Stone Mountain, Ga. |

[54] CONTINUOUSLY OPERATING REVOLVING BROILER
15 Claims, 11 Drawing Figs.

[52] U.S. Cl. .................................................. 99/443,
99/427, 126/338
[51] Int. Cl. ...................................................... A47j 37/06
[50] Field of Search............................................. 99/443,
238.5, 324, 340, 360, 371, 373, 386, 391, 393,
404, 409–410, 423, 427; 126/215, 337–338

[56] References Cited
UNITED STATES PATENTS

| 1,067,428 | 7/1913 | Holder et al. ................. | 126/215 |
| 2,438,699 | 3/1948 | Groetchen.................... | 99/443 X |
| 2,897,746 | 8/1959 | Hilgers ......................... | 99/443 |
| 2,920,177 | 1/1960 | Brane ........................... | 99/443 UX |

*Primary Examiner*—Billy J. Wilhite
*Assistant Examiner*—Arthur O. Henderson
*Attorney*—Parrick F. Henry ABSTRACT: A broiler for restaurants, clubs and the like, for cooking meat on both sides simultaneously on a series of spaced broiler shelves by means of intense infrared reflective heat, therefore virtually without carbon monoxide, whereby steak, chicken, fish and other foods can be cooked within a few minutes, say 3 to 12 minutes depending upon the size and type of food being cooked, and each food being cooked in an individual aluminum pan or casserole. Provision is made for adjusting both the temperature in the cooking zone, and the speed of rotation of the revolving shelves for varying the length of cooking time. A wall-insulated body or cabinet of black steel construction has an array of spaced shelves therein which are power driven respectively about a center shaft. Steel brackets on the interior of said cabinet support in fixed position gas burners, each constructed like a wheel with the burner orifices spaced along the spokes thereof. Segmented fire bricks constructed from refractory ceramic material absorbs the direct flame coming from the burner rings, so that cooking is done by infrared reflected heat at temperatures as high as 800° Fahrenheit. Loading doors for each shelf provide access whereby items may be placed on the shelf and automatically removed with the aid of an ejector bar feeding onto a conveyor.

Patented Aug. 24, 1971

INVENTOR
BASIL H. GIARETTA

BY Patrick Henry
ATTORNEY

INVENTOR
BASIL H. GIARETTA
BY
ATTORNEY

INVENTOR
BASIL H. GIARETTA
BY
ATTORNEY

INVENTOR
BASIL H. GIARETTA
BY
ATTORNEY

Patented Aug. 24, 1971

INVENTOR
BASIL H. GIARETTA
BY
ATTORNEY 3,601,037

CONTINUOUSLY OPERATING REVOLVING BROILER

BACKGROUND OF THE INVENTION

1. Field of the Invention

Field of the invention is that of food and beverage and especially method and apparatus for cooking including cooking on an imperforate sheet or pan with discharging as well as cooking with conveyor and with heat distributed. 2, Description of the Prior Art The following U. S. Patents are noted: Nos. 1,957,811, 1,978,175, 2,005,023, 2,372,362, 2,372,363, 2,375,412.

Similar prior art devices are more complex in construction and assembly than the present device, particularly to combine several shelves or grids and to insulate same within an acceptable cost range and to provide a worthwhile operation. Previously the operation of the gas burners was not entirely acceptable due to the lack of proper mixing of gas and air which is accomplished in the present device by using a self-contained blower and a modified air-gas valve. Furthermore, previous devices have a tendency to break down under the intense heat and to cause binding and mechanical difficulties because of the closure of some of the parts to abnormal heat which is reduced in the present device by the arrangement of the interior insulation and the exterior insulation together with location of the power transmission drive separate from the heated broiler sections. In addition, proper and dependable drive of the previous grids or shelves was a problem because of the failure of the power driving arrangement whereas in the present device the transmission drive through a center shaft is very dependable and permits the use of a firmly protected motor at the bottom. In the previous designs the grids had a tendency to wear abnormally and to fail whereas the improved present grid design separated by asbestos insulation segments provides much longer life. The present firebrick material which is made in "pie-shaped" segments is easy to construct and assemble and much less expensive to replace if necessary than the original firebricks.

SUMMARY OF THE INVENTION

In a revolving broiler: an insulated housing constructed from steel plate or the like and insulated by blanket insulation; an array of vertically spaced shelves inside said housing mounted to revolve therein to convey items to be cooked thereon; access doors in said housing leading to the input of said revolving shelves; a center drive shaft connected to said revolving shelves and driven by means of a variable speed transmission; vertically spaced gas burners supported about said center shaft and stationarily located within said housing, there being a stationary gas burner above each of said shelves and each of said burners including burner orifices at spaced locations above and all around said shelves; firebricks supported by said burners and located there above beneath the next adjacent shelf; and gas burner means having adjustment thereon to mix the gas and air therein.

DESCRIPTION OF THE PREFERRED EMBODIMENT

Figure 1:
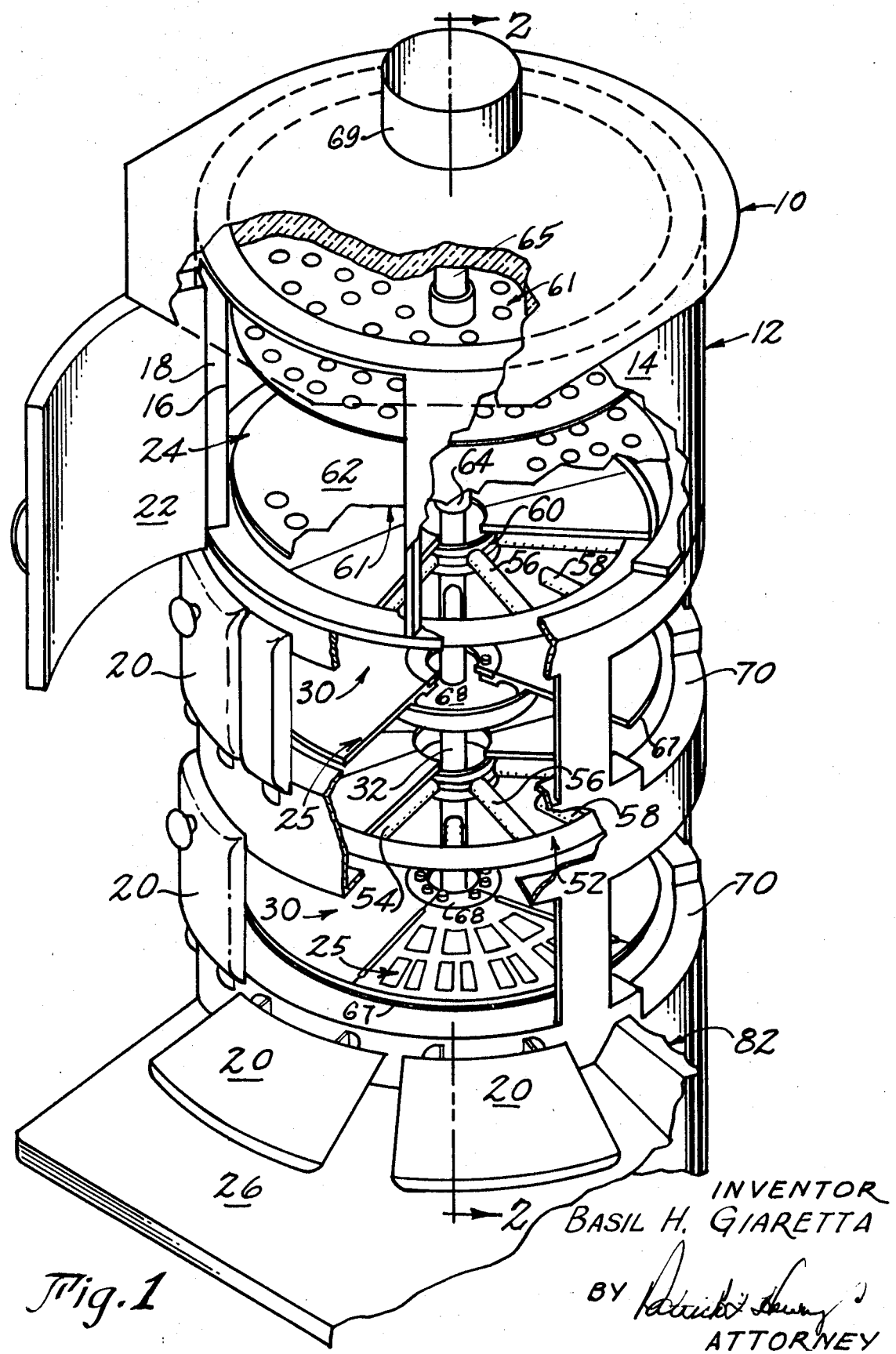
FIG. 1 is a perspective view of the revolving broiler of the present invention with parts broken away.

The complete revolving broiler is designated generally by reference numeral 10 and has a great deal of empty or void space therein. The housing, casing or shelf is designated in assembly by reference numeral 12 and comprises an outer wall of sheet metal or the like 14, spaced from a similar inner wall 16 forming a void therebetween which is filled by a blanket or foam insulating material 18 which may be packed or otherwise suitably placed therein. If preferred the inner wall 16 may be made from stainless steel or polished or treated with plastics, such as "Teflon" to make cleaning easier. However, most of the interior is cleaned by the intense heat which burns most of the impurities.

Figure 2:
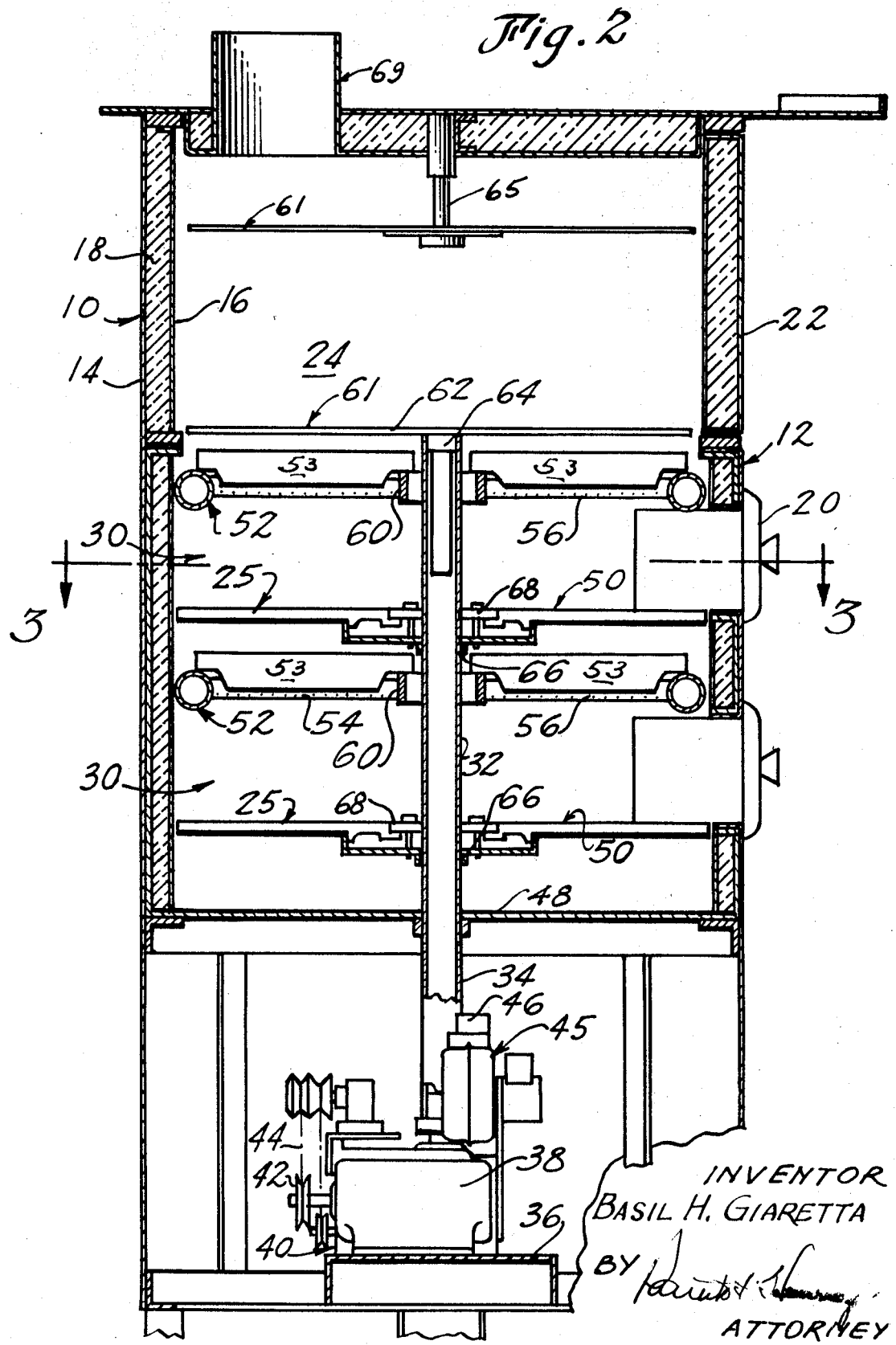
FIG. 2 is a vertical cross-sectional view taken substantially along lines 2-2 in FIG. 1.
Figure 3:
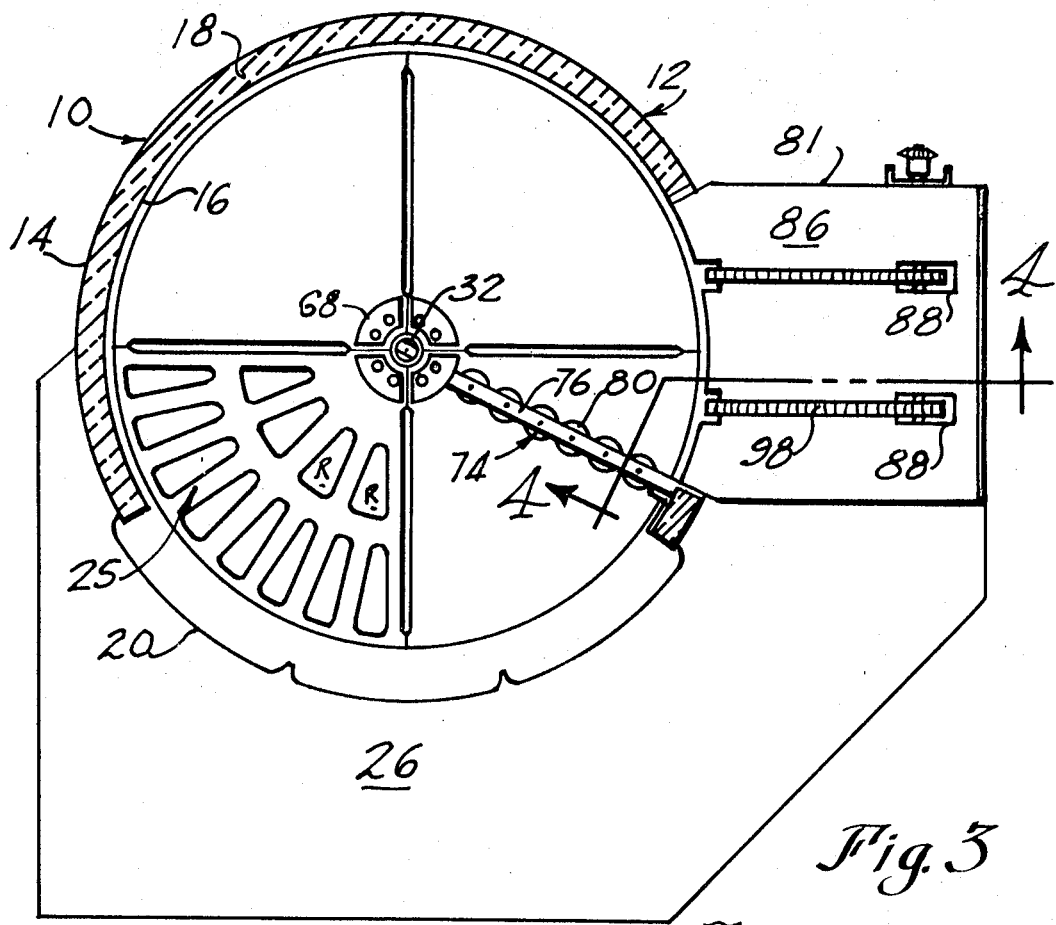
FIG. 3 is a cross-sectional view taken substantially along lines 40-3 in FIG. 2.
Figure 9:
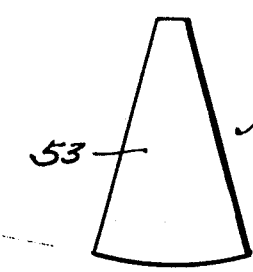
FIG. 9 is a plan view of one of the firebricks.
Figure 6:
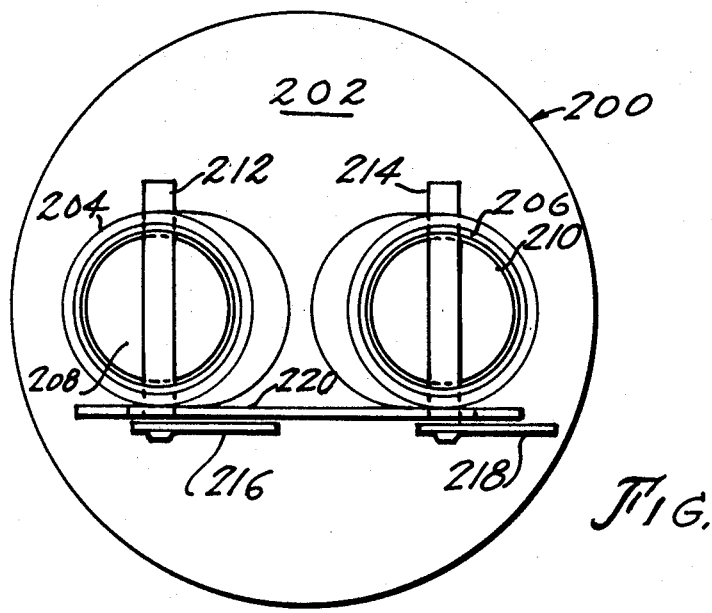
FIG. 6 is a top view of the air control valve shown in FIG. 5.
Figure 7:
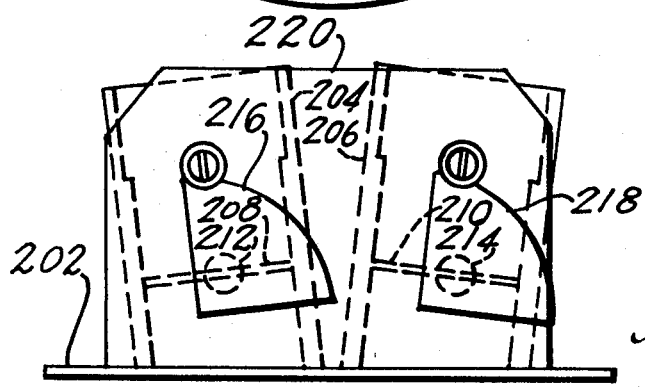
FIG. 7 is a side elevation view of the air control valve shown in FIG. 5.
Figure 5:
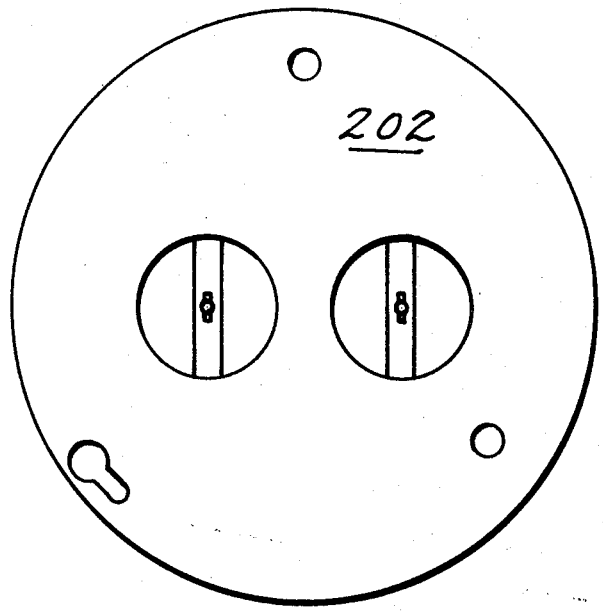
FIG. 5 is a bottom view of the air control valve.
Figure 11:
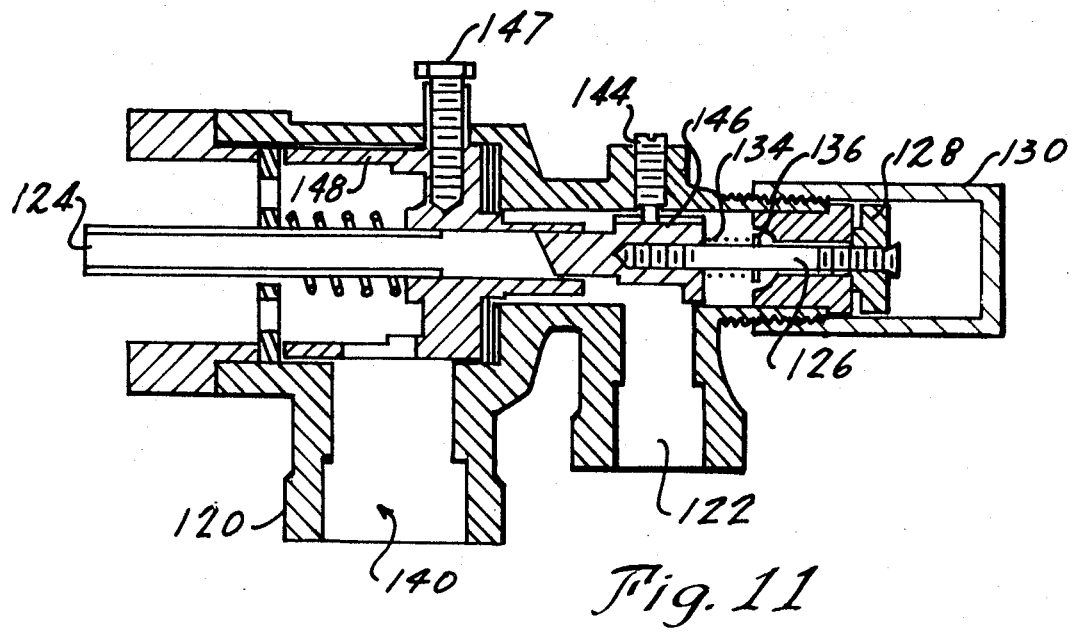
FIG. 11 is a cross-sectional view taken substantially through the center of the gas and air mixing valve.
Figure 10:
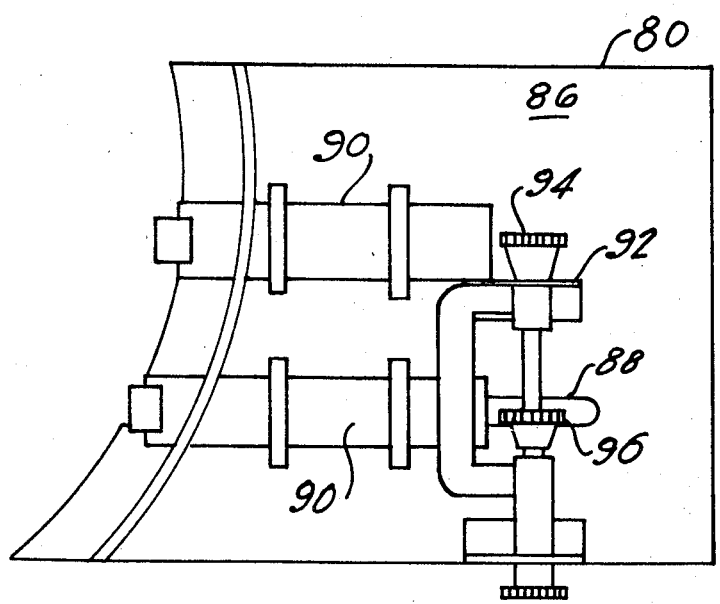
FIG. 10 is a plan view showing the bottom side of the top delivery table.

Access doors 20 are located in spaced vertical relation at different sections and a large access door 22 leads into the top over section which is designated generally by reference numeral 24. A large table 26 is attached to the housing 12 by means of screws and fasteners 28. The broiler sections are designated generally by reference numeral 30 and there are two in the present arrangement although it will readily appear that these may be increased or decreased as desired. Referring to FIG. 2 a hollow power shaft 32 is supported substantially in the center of the housing 12 and extends vertically upward therein to the oven section 24 and at the lower portion is supported on a flanged bushing 34 which is mounted on the output shaft of reduction gear transmission 38 which may be of the sort furnished by Eberhardt-Denver, having a ratio of 3,600 to 1, said transmission being supported on base 36. A motor which maybe a one-fourth horsepower General Electric 110 volt, AC thermally protected is designated by reference numeral 40 and drives a pulley 42 that is connected by belts 44 to the transmission 38. A conventional air blower 45 has a flanged outlet 46 which pumps metered air to gas and air mixing valve (FIG. 11). The broiler section is partially closed on the bottom by a solid mild steel plate 48 and above each broiler grid or shelf 50 is located a gas burner assembly 52 comprising firebricks 53 and a gas burner 54 in the shape of a wheel having joining spokes 56 and short spokes 58 with the joining spokes connected to a center ring 60 surrounding shaft 32. The surface of the burners 52 is covered and closed by means of the firebricks 53 shown in FIG. 9 and made somewhat in a wedge or pie shape from a mold using a well-known lightweight heat-resistant refractory cement of the sort known as ""Kast-O'-Lite" sold by A. P. Green Refractory Company of Mexico, Missouri, which is mixed with water in the amount of approximately 33 gallons per 100 pounds and which cures in about 24 hours to a solid refractory brick. Twelve of these are used to complete the entire 360 ° surface of the burner assembly 52 and may be readily replaced if necessary, either individually or all at one time.

The oven grids are designated generally by reference numeral 61 and each comprises a foraminous or perforated large metal circular plate 62, having a center hub 64, which is mounted to the plate 62. The bottom oven grid 61 rests on and rotates by friction only about the main shaft 32. The top oven grid 61 is suspended by a flanged hanger pin or shaft 65 and does not rotate unless made to do so manually.

Figure 8:
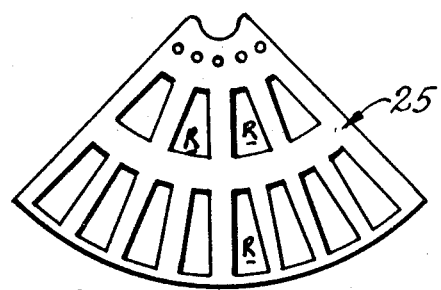
FIG. 8 is a plan view of one of the segments of the grid.
Figure 4:
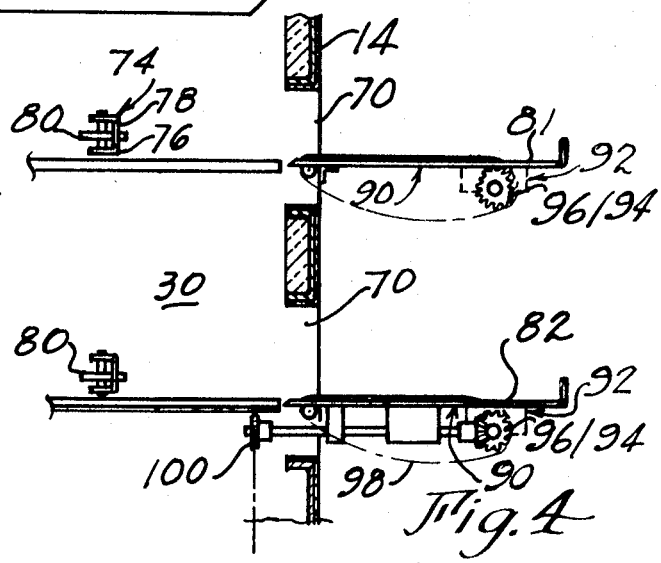
FIG. 4 is a cross-sectional view taken substantially along lines 4-4 in FIG. 3.

Each broiler grid 50 is made up of the four cast iron sections 25. The lower broiler grid 50 has spaces filled with the refractory material mentioned previously for firebricks 53 and is backed up by four corresponding mild steel plate sections 67. The top broiler section contains no refractory material. Both grids are held in position by leverage only with the use of a special hub 68. (See FIG. 8 for top view of broiler grid section 25). The top of broiler 10 has a vent 69.

Items such as poultry, fish or meat placed through the access doors 20 onto the shelves 25 are carried by the revolving shelves from the access door 20 to the eject of dispensing portion, through openings 70 provided in the casing 12 by means of an ejector bar assembly 74 comprising a steel plate 76 having a plurality of slots 78 therein in which are mounted individual wheels 80 and there is an ejector bar assembly 74 for each of the broiler areas 30. Each ejector bar assembly leads to a respective top or bottom delivery table-top table 80 and bottom table 82, which are substantially identical in construction 50 that they will be described using the same numbers to describe identical parts. A flat metal plate 86 has a chain slots 88 therein with chain guide plates 90 thereover. A mounting bracket 92 supports sprockets 94 and 95 to which are connected delivery chains 98 and which are driven by a main drive sprocket 100 and from a gear train 102.

GAS AND AIR MIXING VALVE

Housing 120 has an entry opening 122 therein through which gas enters and the gas travels up through a gas tube 124 controlled by means of a gas needle valve 126 to which is connected a gas flow adjusting knob 128 having an end cap 130 thereover. Gas needle valve 126 operates against a gas needle valve spring 134 and a spring retainer washer 136. Air is first controlled or metered by the air control valve and enters through an opening 140 and premixes with gas while rising simultaneously with gas in the pipe leading to the burners 56, 58. A guide pin 144 is seated in the vertical groove of the gas needle valve 146 and prevents the gas needle valve from turning thus maintaining the relationship of its angle to the gas tube orifice in the gas tube 124. A gas and air control pin 147 is remotely controlled from the table top of the broiler and the configuration of the orifice openings of the mixing valve cylinder 148 automatically provides for the same proportion of air and gas regardless of adjustments made in the change of broiler temperature.

It is important to note the the initial regulation of the gas flowing to the gas tube 124 is effected by gas-flow-adjusting knob 128 which determines the amount of penetration of the gas needle valve 146 into the smaller orifice with the mixing valve cylinder 148 just as the air volume flow is initially set through regulation of the air control valve. Any changes in proportion of gas to air or vice versa are also made through those control elements.

The air control valve is designated in assembly by reference numeral 200 and comprises a flat, circular plate 202 in which is a pair of openings each having a respective pipe 204, 206 and each having a respective diaphragm 208, 210 therein pivotally mounted on a respective pivot 212,214 and controlled by means of a control member 216,218 mounted on a plate 220. Valve 200 attaches to the blower 45 at the flanged outlet 46 to deliver air through pipes 204, 206 to the gas and air mixing valve opening 140 by means of any suitable count (not shown) such as flexible hoses or the like attached to pipes 204, 206 and to opening 140 by any suitable fitting (not shown).

While I have shown and described a particular embodiment of this invention using certain material and a suggested mode of operation this is by way of illustration only since there are various alterations, changes, deviations, eliminations, additions, removals, integrations, separations, changes and other departures which may be made in the embodiment shown and described without avoiding the scope of the invention as defined by interpretation of the appended claims.

What is claimed is:

1. In a continuously operating revolving broiler for restaurants, clubs and the like, for cooking meat on both sides simultaneously by means of intense infrared reflective heat which may reach temperatures as high as 800° F. from burning gas continuously supplied through the boiler;
   a. an insulated broiler housing constructed from steel plate or the like and having a broiler space therein,
   b. an array of vertically spaced broiler shelves inside said housing mounted to revolve in the broiler space therein and convey items to be cooked thereon,
   c. access means in said housing leading up to the said shelves;
   d. a drive shaft connected to said revolving shelves and driven by means of variable speed transmission;
   e. spaced gas burners supported about said drive shaft and stationarily located within said housing, there being a stationary gas burner for each of said broiler shelves and each of said burners including burner orifices at spaced locations above and all around said shelves;
   f. and radiant means supported adjacent said burners and so located thereabove and beneath the shelf to prevent direct flame exposure,
   g. and gas burner adjustment means for mixing gas and air in said burners.

2. The device in claim 1 wherein:
said refractory material is in the form of firebricks made as segments, each of said firebricks being removable and replaceable.

3. The device in claim 2, wherein:
each broiler shelf comprises a plurality of grid sections made from cast iron and the like and each grid having openings therein filled with a refractory material such as asbestos compound.

4. The device in claim 3:
hub means attached to the drive shaft and supporting said grids therefrom.

5. The device in claim 3:
a foraminous plate at the top of said broiler spaced from the shelf and another foraminous plate beneath it, together forming a warming space for bread and the like.

6. The device in claim 1, wherein:
there are also burner conduits extending radially from approximately the center of said burner and being in communication with the continuous burners and insulating means between said radiating burners;

7. The device in claim 1, wherein:
there is a foraminous plate inside said housing and at the top above the upper most shelf.

8. In a continuously operating revolving broiler for restaurants, clubs and the like, for cooking meat on both sides simultaneously by means of intense infrared reflective heat which may reach temperature as high as 800° F. from burning gas continuously supplied through the broiler;
   a. an insulated broiler housing constructed from steel plate or the like and having a broiler space therein,
   b. an array of vertically spaced broiler shelves inside said housing mounted to revolve in the broiler space therein and convey items to be cooked thereon,
   c. access means in said housing leading up to said shelves;
   d. a drive shaft connected to said revolving shelves and driven by means of variable speed transmission;
   e. spaced gas burners supported about said drive shaft and stationarily located within said housing, there being a stationary gas burner for each of said broiler shelves and each of said burners including burner orifices at spaced locations above and all around said shelves;
   f. and radiant means supported adjacent said burners and so located thereabove and beneath the shelf to prevent direct flame exposure,
   g. and gas burner adjustment means for mixing gas and air in said burners,
   h. ejector means for each broiler area and said items such as poultry, fish or meat are placed inside the housing and automatically ejected by said ejector means for each of the respective broiler areas and each ejector means delivering the respective item to a table top or suitable similar surface.

9. The device in claim 8, wherein:
ejector means comprises an ejector bar assembly including a continuously operating ejector drive means.

10. The device in claim 9, wherein:
ejector drive means comprises a flat metal plate with chains lodged therein, a chain guide placed over said chain shots, and continuously operating chains.

11. In a continuously operating revolving broiler for restaurants, clubs and the like, for cooking meat on both sides simultaneously by means of intense infrared reflective heat which may reach temperatures as high as 800° F. from burning gas continuously supplied through the broiler;
   a. an insulated broiler housing constructed from steel plate or the like and having a broiler space therein,
   b. an array of vertically spaced broiler shelves inside said housing mounted to revolve in the broiler space therein and convey items to be cooked thereon,
   c. access means in said housing leading up to the said shelves;
   d. a drive shaft connected to said revolving shelves and driven by means of variable speed transmission;
   e. spaced gas burners supported about said drive shaft and stationarily located within said housing, there being a stationary gas burner for each of said broiler shelves and each of said burners including burner orifices at spaced locations above and all around said shelves;
   f. and radiant means supported adjacent said burners and so located thereabove and beneath the shelf to prevent direct flame exposure,
   g. and gas burner adjustment means for mixing gas and air in said burners, 12. The device claimed in claim 11, wherein:
said air control valve comprising a pair of separate openings each having a respective conduit and each having a respective air control member, each air control member separately control by a separate manually operated control means.

13. The device in claim 12
a hub means attached to said drive shaft and supporting said grids therefrom.

14. The device in claim 1:
each broiler shelf comprising a plurality of grid sections made from cast iron and the like and each grid having openings filled with a refractory material such as asbestos compound.

15. The device in claim 14:
a metal plate on each broiler shelf beneath the grids.